Figure 1:
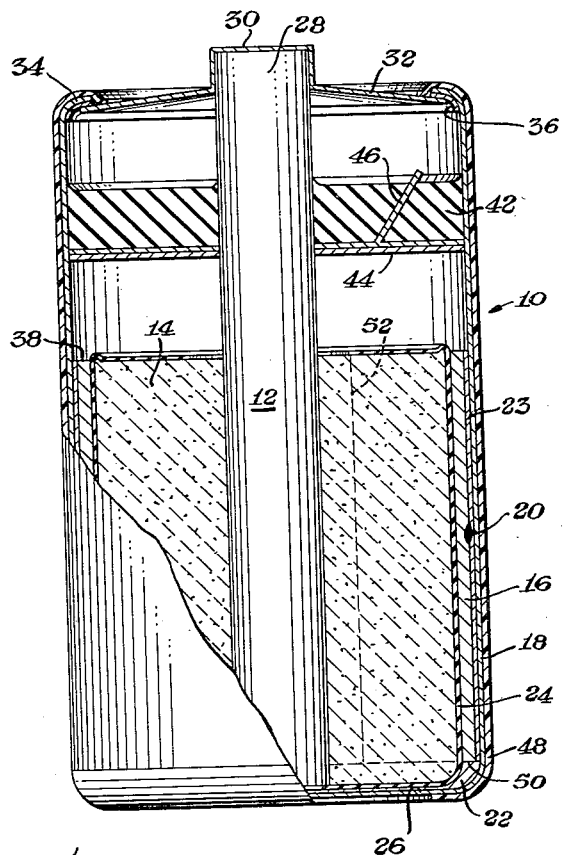

Sept. 10, 1957    R. W. REID ET AL    2,806,079
MAGNESIUM ANODE DRY CELL
Filed Aug. 8, 1955

INVENTORS.
Raymond W. Reid
Roy C. Kirk
BY
Griswold & Burdick
ATTORNEYS

2,806,079

MAGNESIUM ANODE DRY CELL

Raymond W. Reid, Sanford, and Roy C. Kirk, Midland, Mich., assignors to The Dow Chemical Company, Midland, Mich., a corporation of Delaware Application August 8, 1955, Serial No. 527,004

4 Claims. (Cl. 136—133)

This invention relates to an improved primary cell of the dry or nonspillabe type, and particularly to dry cells in which the anode material is magnesium.

Dry cell formulations employing magnesium as the anode material are disclosed in a paper by R. C. Kirk and A. B. Fry, "Magnesium Dry Cells," published in the "Journal of the Electro-chemical Society," vol. 94, No. 6, pages 277 to 289, inclusive.

In making up magnesium primary cells, as mentioned in U. S. Patent No. 2,616,940, "the usual procedure is to form the anode material into a cup or 'battery can' which constitutes one of the electrodes of the cell as well as the container holding the cathode elements and the electrolyte. The cathode mix consists of manganese dioxide having intimately mixed with it usually between about 5 and 15 percent of finely divided carbon, such as acetylene black, by weight. The mixture is moistened with enough electrolyte to make it moldable and the moldable mixture is formed into 'bobbins' around a central electrode in the form of a rod of carbon or graphite. These bobbins are usually cylindrical moldings somewhat smaller than the battery can and are inserted into the cans after the cans are lined with starch paste or gelled electrolyte or a porous nonconductor, such as cloth or paper, to keep the bobbin from touching the can. In some instances the cathode mix is introduced into the lined cans without previously forming the cathode mix into a bobbin, the molding taking place in the lined can. In such instances, after placing the cathode mix in the can the carbon or graphite rod is pushed centrally into the cathode mix as the other electrode."

Similar dry cell formulations are disclosed in U. S. Patent 2,547,907 and 2,547,908. U. S. Patent 2,616,940 discloses that in the cells having the foregoing formulations the can or lining may be dispensed with and the cathode mix may be placed directly against the inside of the can or cup in assembling the cell elements.

Dry cells formulated as above described (with or without lining the can) are usually sealed at the top. Sealing is accomplished by placing a cardboard or similar porous dielectric washer in the top of the can over the end of the carbon rod a short distance above the cathode mix. Then a layer of sealing compound, such as a rosin-base sealing wax, coal tar or asphalt pitch, is poured over the washer so as to fill the annular space at the top of the can above the washer.

While dry cells made in the above described manner give excellent performance, they are not of the so-called leak proof variety which are in wide demand as flashlight batteries. Also the use of a magnesium cup anode is uneconomical from the standpoint of the bobbin size and amount of electrolyte contained in the cell. That is, an un-balance of materials exists because the can or cup anode of the flashlight cell cannot hold enough cathode mix and electrolyte to completely consume a cup shaped extruded anode during the useful life of the cell.

To provide a better balance of materials in a primary cell, it has been suggested that a steel can be used as the container of the cell and that a separate magnesium anode, usually made of sheet stock and rolled into tubular form to fit within the steel can, be used. Such an anode is more economical than a cup shaped container type anode in that it may be made of appropriate shape and weight to chemically match the cathode mix and electrolyte which is contained in the cell. Cells of this last mentioned type are disclosed and claimed in applicants' co-pending application, Serial No. 526,912, filed August 8, 1955, entitled, "Magnesium Anode Primary Cell."

In some cells of this last mentioned type, the steel can has been observed to split after considerable discharge of the cell. Often the cause of the splitting of the can has been found to be magnesium hydroxide which has built up between the anode and the can walls as a corrosion product of the anode.

Accordingly, a principal object of this invention is to provide an improved economical primary cell having a magnesium anode encased in a metal container and which is resistant to bulging of the sides of the container.

In accordance with this invention the side of the anode which is in juxtaposition with the cup or container is coated with an insulating hard surfaced tightly adhering coating such as paint, enamels, lacquer, or plastic which prevents corrosion of the coated side of the anode and thus prevents the buildup of corrosion products (magnesium hydroxide) between the anode and the cup or container.

Figure 2:
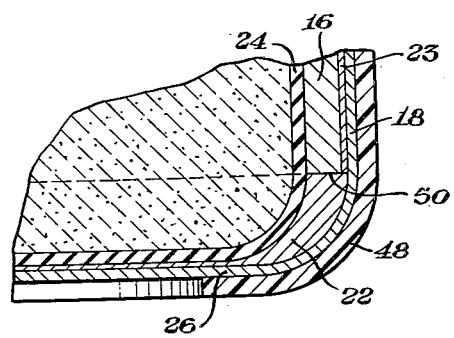

The invention, as well as additional objects and advantages thereof, will best be understood when the following detailed description is read in connection with the accompanying drawings, in which:

Fig. 1 is a side elevational view, partly in section, of a primary cell made in accordance with this invention, and Fig. 2 is a fragmentary view, on an enlarged scale and in section, of the lower part of the cell shown in Fig. 1.

Referring to the drawings, there is shown a primary cell, indicated generally by the numeral 10, comprising a cathode electrode 12, cathode mix 14 including electrolyte, and a tubular shaped magnesium anode 16 encased in a steel can 18. The anode 16 abuts against the can 18 and is welded to the can, as at 20, in at least one place. The anode 16 is often made of sheet stock which is bent into tubular form. The abutting edges of the sheet are usually slightly separated.

The bottom of the can 18 is coated with an insulating material 22, such as grease, oil or lacquer. The cathode mix is contained in a paper separator bag 24 which fits within the anode 16 and rests on the insulating material at the bottom of the can 18. The cathode electrode 12, which is a carbon or graphite rod within the bag 24, is axially disposed with respect to the can 18. The lower end of the electrode rod 12 lies against the bottom of the paper bag 24 and is insulated from the bottom 26 of the can or cup 18 by the bag 24 and the coating 22 of grease or oil.

The top 28 of the cathode terminal electrode 12 extends above the top of the steel can 18, and is held in position by a somewhat hat-shaped cover plate 30 whose periphery or "brim" 32 extends to and is insulated from the turned in upper end 34 of the steel can 18. Insulation between the can 18 and cover plate 30 is provided by a paper ring or annulus 36 which separates the two parts.

The magnesium anode 16 extends about ⅔ of the length of the steel can 18 and fits closely within the steel can 18. The side of the anode 16 which is in juxtaposition with the inner wall of the can 18 is coated with an electrically insulating tightly adhering fluid-impermeable coating 23 such as lacquer, enamel, paint, or a tightly adhering plastic film such as a vinyl chloride or other resin type film.

Since the electrolyte in the cell permeates around the anode 16 and between the anode 16 and the steel can 18, the inner or un-coated anode surface cathodically protects, at least to a degree, the inner wall of the steel can.

The cathode mix 14 extends between the carbon rod 12 and the anode 16. The mix 14 is in direct contact with the carbon rod 12 but is separated from direct contact with the anode 16 by the paper bag 24 in which the mix is contained. The cathode mix 14 extends to or near to the top 38 of the anode 16, and the upper wall 40 of the paper separator bag 24 is turned in towards the carbon rod 12 to help prevent the spilling of cathode mix 14 directly onto the anode 16.

A tar seal 42 is provided between the carbon rod 12 and the steel cup 18. An apertured paper washer 44 is fitted between the carbon rod 12 and the can 18 to provide the base on which the tar seal 42 is poured. A paper tab 46 extending upwardly from the washer 44 through the tar seal 42 provides the means by which gas generated within the cell 10 while current is drawn therefrom is vented to the upper portion of the cell which is not sealed in a gas tight manner. Alternatively, a porous carbon rod 12 may be used to vent gases from the cell. In such cases the cover plate 30 usually contains a small aperture adjacent to the rod 12.

The volume between the top of the anode 16 and the seal 42 is needed because gases may be generated within the cell at a faster rate than they may be vented through the tab 46. The additional space between the tar seal 42 and the cover plate 30 is provided in order that a specific cell dimension may be maintained, e. g., a standard length flashlight cell as established for zinc anode type cells.

In order that two or more of the cells 10 will not short out when connected in series in a metal cased flashlight, an insulating plastic coating 48 is provided on the side walls and part of the ends of the can 18. It should be emphasized that the insulating coating may be dispensed with if the cells are to be used in parallel or even if connected in series if the cells are used in an electrically non-conductive container.

In cells made in accordance with this invention the protective coating on the "can" side of the anode prevents the building up of pressure between the anode and can due to magnesium hydroxide being formed therebetween. The electrical contact between the anode and the steel can may be made by means of one or more welds 20 or in any other suitable manner.

Formulations of suitable electrolytes and dry mixes for dry cells having magnesium for the anode material are disclosed in the aforementioned U. S. Patents 2,547,907, 2,547,908, 2,606,940, and paper by Kirk and Fry.

The anode 16 in a specific cell made in accordance with this invention is composed of AZ31A alloy sheet of .030 wall thickness rolled to form a cylinder 1.25 inches in diameter and 1.5 inches high. In addition to magnesium, AZ31A alloy contains nominally 3 percent aluminum, 1 percent zinc and about .15 percent calcium. The anode cylinder 16 fits closely within the drawn steel can 18 with the bottom edge 50 of the anode 16 at or near to the bottom 26 of the can 18. As mentioned previously, the anode 16 is preferably welded (spot welded, for example) to the can 18 at least at one point, the location of the weld 20 being about midway between the ends of the anode 16. Usually 3 welds, spaced approximately symmetrically around the anode 16, are used. The edges of the anode sheet which are in juxtaposition with each other are usually separated by .005 inch or less in order to prevent an excessive amount of electrolyte from passing between the juxtaposed edges (shown as the dotted line 52 in Fig. 1) and being dispersed between the anode 16 and the cup 18.

As previously mentioned, the bottom 26 of the steel can 18, which serves as the anode terminal electrode, is protected from corrosion due to electrolytic action by an insulating coating of oil, grease or lacquer, for example, which extends over the bottom (inside) of the can 18. The bottom of the paper bag containing the cathode mix, electrolyte, and carbon rod supplements the insulating coating in preventing electrical contact between the carbon rod and the steel cup.

Thus since protection against corrosion of the can side of the anode 16 is provided, bulging and cracking of the sides of the can due to localize pressure buildup between the anode 16 and the can 18 is eliminated.

What is claimed is:

1. A primary cell comprising a drawn steel cup of tubular cross sectional configuration and which is a terminal electrode of said cell, the side wall of said cup being substantially perpendicular to the bottom of said cup, a hollow, cylindrically shaped magnesium anode disposed within and having one side in close fitting relationship with the side wall of said cup, the lower edge of said anode being disposed at least near to the bottom of said cup, a hard layer of electrically non-conductive, tightly adhering fluid impervious material disposed on and bonded to the side of said anode which faces the wall of said cup, a welded connection between said anode and the wall of said cup, a carbon cathode electrode disposed in said cup with one end projecting beyond the cup, the cathode electrode being insulated from the bottom of the cup, and a cathode depolarizing mixture comprising manganese dioxide and carbon black moistened with an aqueous electrolyte, the mixture being interposed between the cathode electrode and the anode.

2. A primary cell in accordance with claim 1, wherein said electrically non-conductive, tightly adhering, fluid impervious material is enamel.

3. A primary cell in accordance with claim 1, wherein said electrically non-conductive, tightly adhering, fluid impervious material is lacquer.

4. A primary cell in accordance with claim 1, wherein said electrically non-conductive, tightly adhering, fluid impervious material is a vinyl resin.

References Cited in the file of this patent

UNITED STATES PATENTS

| | | |
|---|---|---|
| 1,225,306 | Benner et al. | May 8, 1917 |
| 2,198,423 | Anthony | Apr. 23, 1940 |
| 2,434,703 | Koppelman | Jan. 20, 1948 |
| 2,697,738 | Glesner | Dec. 21, 1954 |